Feb. 12, 1935.   D. H. ANNIN   1,991,309
PILOT VALVE PRESSURE CONTROLLER
Filed Oct. 21, 1931   3 Sheets—Sheet 1

INVENTOR:
BY Douglas H. Annin,
O O Martin.
ATTORNEY.

Feb. 12, 1935.  D. H. ANNIN  1,991,309
PILOT VALVE PRESSURE CONTROLLER
Filed Oct. 21, 1931  3 Sheets-Sheet 3

INVENTOR:
Douglas H. Annin
BY O O Martin
ATTORNEY.

Patented Feb. 12, 1935

1,991,309

UNITED STATES PATENT OFFICE 1,991,309

PILOT VALVE PRESSURE CONTROLLER

Douglas H. Annin, Glendale, Calif., assignor, by mesne assignments, to Eldon Macleod, Westwood, Mass., Frank A. Morrison, Newton, Mass., Cameron Macleod, Berwyn, Pa., Leslie Soule, Dedham, Mass., and Sullivan A. Sargent, Jr., Needham, Mass., trustees, doing business as Mason-Neilan Regulator Company, Boston, Mass.

Application October 21, 1931, Serial No. 570,131

11 Claims. (Cl. 50—10)

This invention has relation to a pilot device employed automatically to maintain uniform control of pressure, volume, temperature or rate of flow within an apparatus.

Installations, as here considered, usually include a diaphragm motor valve controlling either back pressure or reduced pressure in the main line, and the device I am about to describe is introduced for the purpose of controlling the functioning of such valve.

The preferred type of pilot device, now in use, includes a reducing valve and a relief valve, and means for controlling the operation of these valves.

Such devices of this type, as have come under my observation, are fairly accurate, and they function satisfactorily in installations where a high degree of accuracy is not required.

The general object of the present invention is to provide an improved pilot controller device giving substantially perfect and uniform indications throughout its entire range of operation.

The valve controlling means, above referred to, usually comprises a Bourdon tube, pressure bulb, thermo couple, or Wheatstone bridge type of control connected to operate an element, usually termed a flapper, positioned to control a discharge orifice of the pilot controller.

The sensitiveness of the pilot controller depends, to a large extent, upon the efficiency of such flapper. An object of this invention is to provide a discharge control mechanism of an entirely new type designed to eliminate the errors inherent in the type of flapper heretofore employed.

The objects of my invention will be fully understood upon reading the following description in connection with the accompanying drawings, in which a pressure control installation embodying the invention is illustrated.

Figure 1:
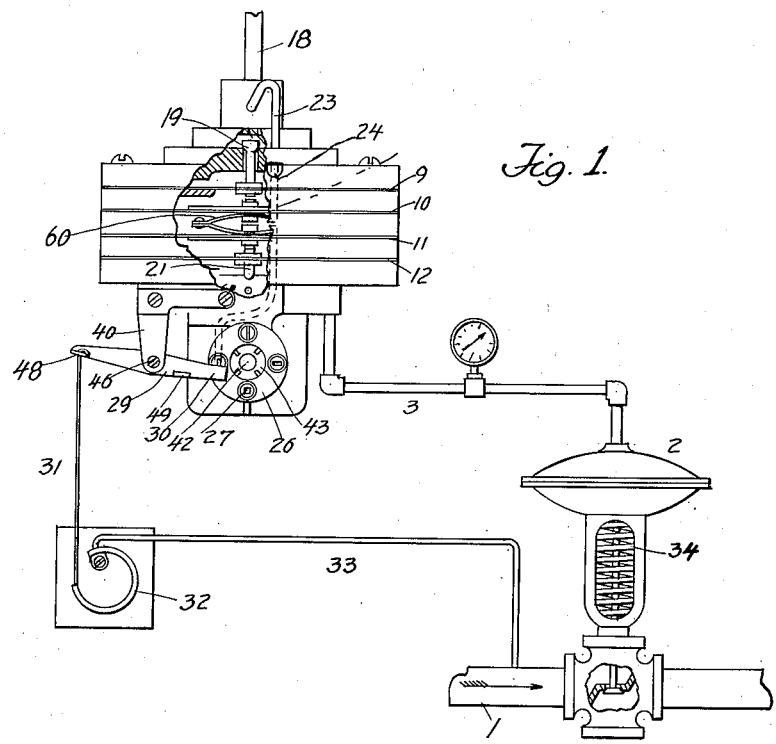
Fig. 1 is a diagrammatic side elevation of a structure embodying the invention.

The numeral 1 designates a feed line controlled by a diaphragm motor valve 2, and this motor valve is operable by fluid pressure through a pipe 3. The pilot controller proper comprises a preferably cylindrical casing divided into five sections 4, 5, 6, 7, 8, separated by a series of diaphragms 9, 10, 11, 12. In this manner, the casing is divided into five chambers 13, 14, 15, 16 and 17.

Fluid pressure is admitted to the casing through a pipe 18, into a chamber 13 controlled by a reducing valve 19 of the diaphragm 9. The chamber 13 communicates with the chamber 17 in any suitable manner, as by a pipe or duct 20. The diaphragm 12 supports a valve 21, controlling an exhaust 22. The aforesaid pipe 3 communicates with the chambers 13 and 17. Normally, when the diaphragms are at rest, the valve 19 is closed and the relief valve 21 open, cutting off the supply of fluid pressure to the diaphragm motor valve 2 and wasting the pressure in the pipe 3 through the discharge duct 22. The chambers 14 and 16 communicate with the atmosphere through the circular ports shown in Fig. 2.

From the pipe 18 extends a pipe 23, through a duct 41, to the center chamber 15. The lower portion of the duct 41 terminates in an orifice 25, covered by a dial 26, which in turn is provided with a series of ports 27, for registration with the orifice of this pipe. On a pivot 28 is mounted a lever 29, terminating at one end in a plate 30, and this plate rests against the surface of the dial 26. The opposite end of the lever is, by a link 31, connected for operation by a helical tube 32. A pipe 33 leads from the feed pipe 1 to this helical tube.

As above stated, the diaphragms within the controller are normally at rest. Let it be assumed, that the mechanism illustrated is set for maintaining an exact back pressure in the main line, the diaphragms being at rest and the pressure in the pipe 3 being relieved through the valve 21. The diaphragm motor valve is held closed by its spring 34 and back pressure builds up within the main line 1. This pressure is free to pass through the pipe 33 to the helical tube 32, tending to unwind this tube and thereby to turn the lever 29 on its pivot, gradually to reduce the size of the alined port in the dial 26. Pressure now commences to build up within the chamber 15, causing the relief valve 21 to close and the reducing valve 19 to open, admitting fluid pressure through the pipe 3 to the diaphragm of the motor valve, which opens against the tension of its spring to relieve the back pressure.

In a general sense, a control system such as above described is known to the art and widely used, affording a fair degree of accuracy in maintaining uniform conditions within the substance under control. In such systems, the adopted type of flapper is a plate pivotally mounted in front of the discharge orifice of the pilot controller and movable towards and away from the orifice for the purpose of closing and opening the latter. The objection to this type of flapper is that the fluid pressure from within the pilot controller is directed against the line of movement of the flapper, which must entirely close the orifice in order to build up the required pressure within the pilot controller. The force tending to push the flapper away from the orifice puts an extra load on the device operating the flapper, whether it is a helical tube, as above described, a float, or whatever actuating medium is employed in the particular type of instrument considered.

Figure 3:
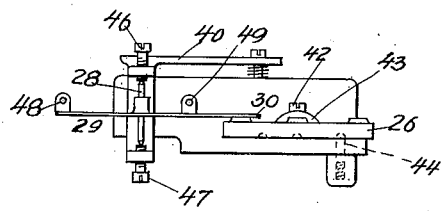
Figs. 3 and 4 are fragmentary views of parts of the controller, the importance of which are hereinafter fully described, and Charts illustrating the operation of the pilot controller are shown in Figs. 5, 6 and 7.
Figure 4:
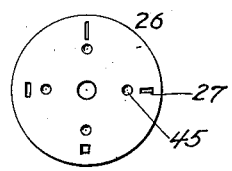

The effect of this extra load is materially to reduce the efficiency of the device. My experience with this type of flapper has also been, that such close setting, for field adjustment, is necessary as to make it commercially impractical. After experimenting with several modifications of this type of flapper, I conceived the idea of moving the flapper arm across the discharge orifice of the pilot controller instead of in the direction of discharge and, after considerable experimenting, I developed the mechanism shown in the drawings and fully illustrated in Figs. 2 and 3.

On the casing is mounted an L-shaped bracket 40, on which the dial 26 is fixed to rotate. The dial is shown made with four equidistant ports 27, all of which are rectangular and equal in area, but vary in shape from a square port to a long slit. The dial is held rotatably by a screw 42, below which a spring washer 43 may conveniently be placed. In the bracket is seated a spring-held plunger 44, alined to engage pockets 45 of the dial for the purpose of maintaining any one of the ports yieldingly in line with the orifice of the duct 41. It is now noticed that the pivot 28 is relatively long and mounted for adjustment by means of screws 46 and 47. This simple means of frictionless suspension insures perfectly alined movement of the arm relative to the dial ports. It is to be noted, that the arm 29 is made with two lugs 48, 49, one on each side of the pivotal point.

Where the device is used for controlling back pressure, the connection 31 should be hooked into the lug 48, and where employed for controlling reduced pressure, it is merely required to hook the connecting link into the lug 49. Means, such as a staple 50, see Fig. 2, may conveniently be employed to limit the movement of the arm 29. Pilot controllers of this type have heretofore been made in three sections of equal area, supporting two diaphragms, on which the reducing valve and the relief valve are mounted, respectively. Let it be assumed that air under fixed pressure enter such device. The flapper, as formerly used, would have totally to seal the discharge orifice, in order to build up a pressure in the center chamber equal to that entering the pilot controller. This mechanism gave complete throttling action which, of course, meant that, if the pressure of the center chamber was changed from one to two pounds, it would give a corresponding change of from one to two pounds in the intercommunicating reducing valve and relief valve chambers. This equal proportional change of pressure from the center chamber to the two outside chambers would remain constant whether the supply of fluid pressure to the pilot controller was set at five pounds, at fifty, or at any value within the range of the device. Because of the difficulty of obtaining a complete closing of the discharge orifice, with the type of flapper used, as above pointed out, such structure has been found commercially impractical.

Figure 2:
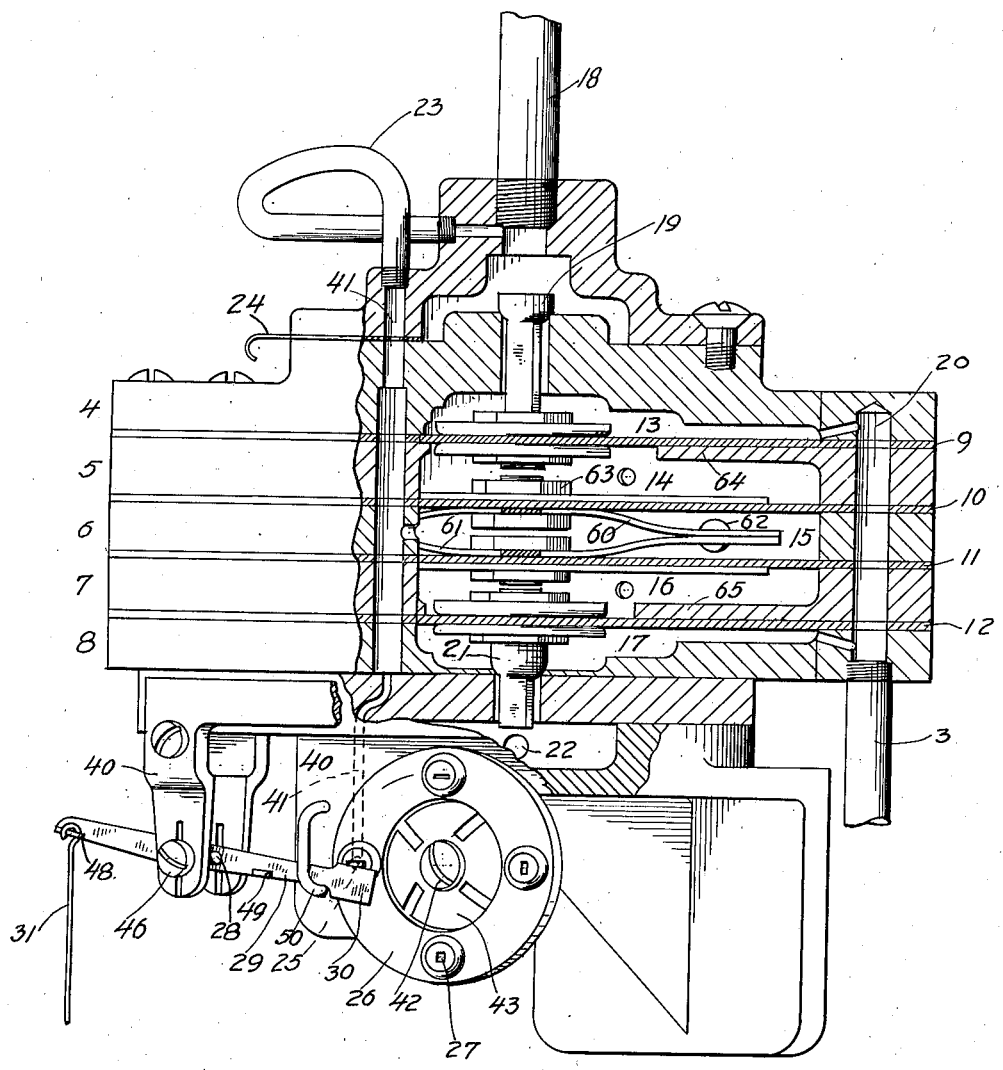
Fig. 2 shows, on a larger scale, the pilot controller of my invention, with parts of the casing broken away for the purpose of exhibiting the interior mechanism of the controller.

Returning now to the mechanism within the pilot controller, reference is invited to Fig. 2. It was stated above, that increase of fluid pressure within the chamber 15 resulted in the opening of the reducing valve 19 and closing of the relief valve 21. A detailed description of this operation will now be given. In the center of chamber 15 is shown seated a spider-shaped spring structure, comprising opposed members 60 and 61, which may be exactly alike, and are shown fastened together by rivets 62. The member 60 is shown fastened to the diaphragm 10 by means of a threaded nut 63, and the member 61 is similarly mounted on the diaphragm 11. The spider tends to maintain the diaphragms at rest, in normal position, and any expansion takes place against the spring tension of this spider.

Figure 5:
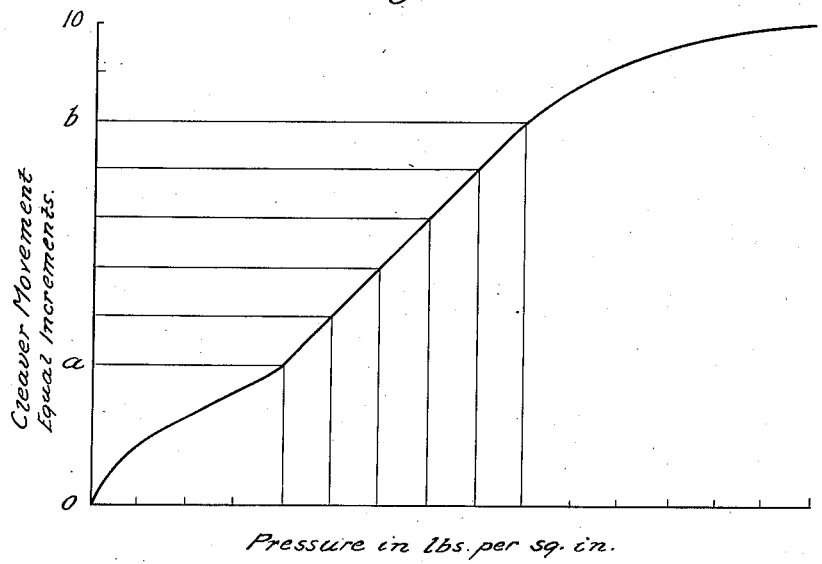

The purpose of the spider will now be explained. From exhaustive tests I have found that, if the movement of the lever 29, which for convenience I prefer to call the cleaver, is calibrated in equal increments from open to closed position relative to the discharge orifice, there will be produced a pressure effect in the outer or controlling chamber 13, 17, in definite proportion to the effect produced in the center chamber. Plotting a curve of increment movement in equal units against pressure effect in pounds, a result was produced substantially similar to the one shown in Fig. 5. A careful examination of this view discloses peculiar variations.

During the early part of the cleaver movement, substantially from 0 to $a$, a considerable variation took place, indicated by the pronounced curve between these two points. During the middle portion of the cleaver movement this curve flattened out substantially to a straight line. The last portion of the cleaver movement, from $b$ to 10, again exhibited a pronounced curve indicating a decided variation.

It then came to me that, if I should succeed in limiting the effective operation of the cleaver mechanism to the period between $a$ and $b$, I would then have attained the necessary degree of synchronism, which would maintain a fixed and constant relation between the operation of the indicating factor, in this case the Bourdon tube 32, and the pressure of the control device.

Several careful tests showed, that the intermediate cleaver movement $a-b$ holds certain definite relations to the entire cleaver movement. To illustate such relations, let it be assumed that the pressure fluid admitted into the center section of the pilot controller is always of uniform volume and at a pressure of fifteen pounds, and that the spider is so designed, that a pressure of three pounds is required to overcome the static load of the spider. I have found that, from this point and until a pressure of about six pounds is attained within the inner chamber, a substantially uniform relation exists between the closing movement of the cleaver and the pressure increase within the inner chamber.

The problem of utilizing this intermediate portion of the cleaver movement and the relatively correct pressure relation within the inner chamber was solved by decreasing the operating area of the outer diaphragms 9 and 12, substantially to one-third the operating area of the diaphragms 10 and 11, that is to say, in a proportion which will produce a predetermined maximum controlling chamber effect at a predetermined controlled chamber effect. This is shown accomplished by forming the sections 5 and 7 with inwardly directed annular flanges 64 and 65, against which diaphragms 9 and 12 are held pressed by the fluid pressure within the chambers 13 and 17. It should be clear to anyone versed in the art, that this pressure always remains higher than the atmospheric pressure within the chambers 14 and 16.

Figure 6:
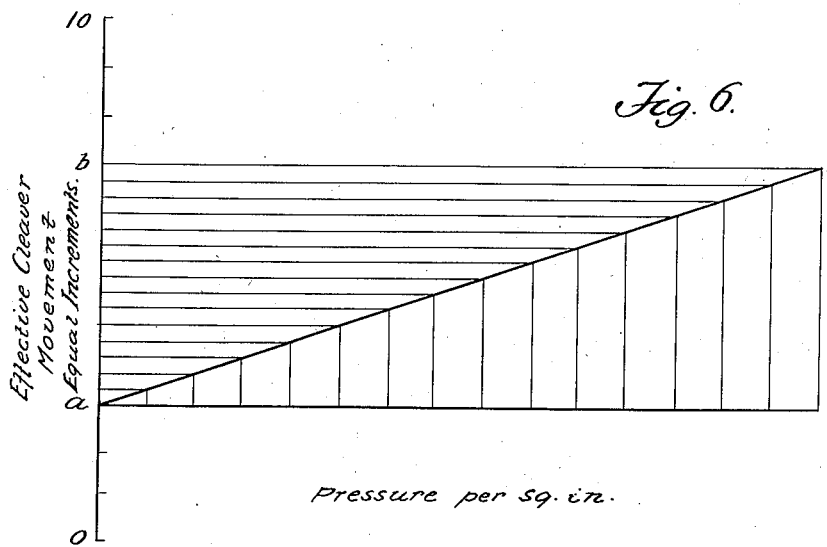

Combining, substantially as described, the advantages of the spider with the benefits of the unequal pressure relation of the inner and outer chambers it is found, that perfect synchronism of cleaver movement to pressure effect is attained within predetermined limits. This result is suggested in the chart shown in Fig. 6 of the drawings. The chart illustrates that, by means of the spider, I have eliminated the effect of the cleaver travel from 0 to $a$ and that, by means of the diaphragm ratio, the cleaver travel $b$ to 10 has been eliminated. It also shows that, during the cleaver travel $a$ to $b$, the full range of pressure up to the fifteen pounds is utilized to control the diaphragm motor valve. Furthermore it is to be noted that, as the cleaver travel $b$ to 10 is not utilized, it follows that complete closing of the orifice 25 never is necessary, and that thereby one of the main difficulties of the pilot controllers now in use is eliminated.

The timing of the pilot controller depends primarily upon the flow of the pressure fluid to the center, controlling chamber and to the dial type discharge regulator. It is common practice to cut a valve into the pipe 23 for the purpose of proper control. Because such valve is easily tampered with, or otherwise may get out of adjustment, I find it more satisfactory to clamp a thin strip of metal, or tongue 24 between the parts of the casing, substantially as indicated in Fig. 2. This tongue is made with an orifice of the proper size to determine the flow through the duct 41. The tongue may readily be removed, and replaced by one having a different size orifice, by merely loosening a couple of screws, without otherwise disturbing the mechanism of the pilot controller.

The operation of the pilot controller is furthermore timed by adjusting the dial 26 to bring the desired port 27 into line with the orifice 25. By combining the two features, of the proper size fixed orifice with the proper dial port, a wide range of pilot controller timing may be obtained.

Figure 7:
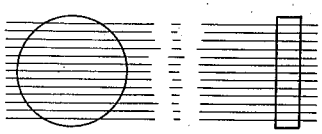

A rectangular port must replace the circular orifice heretofore used in connection with the common flapper, in order to maintain a uniform change of port area in response to uniform cleaver movements. This is best understood by referring to Fig. 7, where the area of the rectangular port is subdivided into a number of equal areas corresponding to equal movements of the cleaver, whereas the area of the circular orifice changes in increasing and decreasing progression in response to uniform cleaver movements.

The foregoing description should suffice to indicate the scope of the invention. I believe it to be new in pilot controllers to actuate a supply and waste valve when a certain, fixed, predetermined degree of pressure is attained. No cleaver type of orifice regulator, such as here presented, has come to my notice. I believe a constant bleeder type of pilot controller to be new in the art. And utilizing only the most advantageous portion of the cleaver movement to control the entire range of the controlled pressure is not only radically different from present practice, but of great advantage. This advantage resides not only in the uniformity of operation attained, not merely in avoiding complete closing of the bleeder orifice, but also in the fact that, as the slightest cleaver movement is translated into a much greater controlled pressure variation, an extremely quick and sensitive controlling device is provided.

I claim:

1. In a device for controlling a feed line, a pilot controller for conveying an actuating medium under constant pressure to a diaphragm motor valve controlling said feed line, said pilot controller including separate and independent reducing and relief valves, means within said controller and movable by said medium for operating said reducing and relief valves, means sensitive to feed line variations to control the pressure within said valve operating means, and means to maintain the latter inoperative until a predetermined pressure is attained.

2. In a pilot controller supplied with constant fluid pressure, a supply valve and a relief valve, an expansive member movable by said fluid pressure to operate the said valves and having a discharge orifice, means within said member restricting its operation to be effective above a predetermined pressure, a member operable by pressure within a substance under control to regulate the opening and closing of said discharge orifice, and means for adjusting the shape of said orifice.

3. In a fluid pressure operated pilot controller, a pair of diaphragms dividing the controller into two intercommunicating outer chambers and an inner chamber, a supply valve on one diaphragm controlling the entrance to said outer chambers and a relief valve on the other diaphragm controlling the waste discharge from the outer chambers, means intermediate said diaphragms and movable by the fluid pressure to operate said valves, means operable by variations in a substance under control to regulate the fluid pressure within said inner chamber, and means within the inner chamber restricting to function above a predetermined pressure.

4. A pilot controller divided by four diaphragms into two intercommunicating outer chambers, a center chamber, and two intermediate spaces under atmospheric pressure, the operating area of the two outer diaphragms being smaller than the operating area of the two inner diaphragms, the passage through said outer chambers being controlled by supply and relief valves carried by the two outer diaphragms, the passage through said center chamber to the atmosphere being controlled from the substance under control, and a resilient member within said inner chamber and mounted on the two inner diaphragms for the purpose of maintaining said inner diaphragms inoperative until a predetermined pressure is attained within the center chamber.

5. In a pilot controller actuated by constant fluid pressure, supply and relief valves, means actuated by said fluid pressure to operate said valves, means connected for operation by a substance under control to open and close the discharge orifice from said valve operating means, and a dial mounted for rotation on the controller, said dial being provided with a plurality of annularly positioned rectangular ports of different shapes for alinement with said discharge orifice.

6. In a pilot controller having a passage for an actuating pressure medium, a supply and a relief valve in said passage, a capsular member within the passage and connected to take a portion of the actuating medium before it reaches the controller and to carry it to the atmosphere, means for controling the discharge orifice of said capsular member, means maintaining said capsular member inoperative below a predetermined pressure limit, the said member being fitted to operate the said valves above said pressure limit, the devices being proportioned to cause a lower pressure within the capsular member to be translated into a higher pressure within said passage.

7. In a fluid operated pilot controller provided with a discharge orifice for the operating medium, a disk mounted to rotate on the controller casing and made with a plurality of annularly positioned rectangular ports of different shapes for alinement with said orifice by rotating the disk, a lever pivotally mounted on the casing adjacent said disk, one end of said lever resting against the face of the disk, and means actuated by a substance under control and connected to slide the end of the lever across the alined port of the disk.

8. In a control mechanism, a pilot valve mechanism operated by fluid pressure including a casing, a plurality of diaphragms dividing said casing into an inner chamber, intermediate chambers and outer chambers, a supply valve and a waste valve in said outer chambers governing the supply and waste of pressure through said pilot mechanism and operable on the expansion of said inner chamber by said pressure, an expansible element in said inner chamber rendering the same inoperative until a predetermined pressure is reached, and said outer diaphragms having a reduced operating area limiting the movement of said diaphragms after a predetermined pressure is reached in said inner chamber.

9. Control mechanism of the class described, comprising a medium under control, a control valve governing the supply of said medium, an independent pressure system for operating said control valve ordinarily exhausting to the atmosphere, an exhaust port through which said pressure system ordinarily exhausts to the atmosphere, a cleaver arm movable across said exhaust port to close the same, means responsive to a variable of the medium under control for actuating said cleaver arm, a pilot valve mechanism including a casing, a plurality of diaphragms dividing said casing into an inner chamber, intermediate chambers, and outer chambers, a supply valve and a waste valve in said outer chambers governing the supply and waste of pressure in said system and operable on the expansion of said inner chamber, an expansible element in said inner chamber rendering the same inoperative until a predetermined pressure is reached, studs on said diaphragms for translating the movement of said inner chamber diaphragms to said supply and waste valves, said pressure expanding said inner chamber and actuating said supply and waste valves to divert said pressure to the control valve for operating the same on the closing of said exhaust port by the cleaver arm.

10. Control mechanism of the class described, comprising a medium under control, a control valve governing the supply of said medium, an independent pressure system for operating said control valve ordinarily exhausting to the atmosphere, an exhaust port through which said pressure system ordinarily exhausts to the atmosphere, a cleaver arm pivoted intermediate its ends and movable across said exhaust port to close the same, means responsive to a variable of the medium under control for actuating said cleaver arm, pilot valve mechanism including a casing, a plurality of diaphragms dividing said casing into an inner chamber, intermediate chambers open to the atmosphere, and outer chambers, an expansible element in said inner chamber rendering the same inoperative until a predetermined pressure is reached, said outer diaphragms having a reduced operating area limiting the movement of said diaphragms after a predetermined pressure is reached in said inner chamber, a supply valve and a waste valve in said outer chambers governing the supply and waste of said pressure in said system, studs on said diaphragms for translating the movement of said inner chamber diaphragms to said supply and waste valves, said pressure expanding said inner chamber and actuating said supply and waste valves to divert said pressure to the control valve for operating the same on the closing of said exhaust port by the cleaver arm.

11. Control mechanism of the class described, comprising a medium under control, a diaphragm motor valve governing the supply of said medium, an air pressure system for operating said motor valve ordinarily exhausting to the atmosphere, an exhaust port through which said pressure system ordinarily exhausts to the atmosphere, means for adjusting the size of said exhaust port, a cleaver arm pivoted intermediate its ends and movable across said exhaust port to close the same, a Bourdon tube responsive to the pressure of the medium under control for actuating said cleaver arm, pilot valve mechanism including a casing, a plurality of diaphragms dividing said casing into an inner chamber, intermediate chambers opening to the atmosphere, and outer chambers, an expansible element in said inner chamber rendering the same inoperative until a predetermined pressure is reached, said outer diaphragms having a reduced operating area limiting the movement of said diaphragms after a predetermined pressure is reached in said inner chamber, a supply valve and a waste valve in said outer chambers governing the supply and waste of said pressure in said system, studs on said diaphragms for translating the movement of said inner chamber diaphragms to said supply and waste valves, said pressure expanding said inner chamber and actuating said supply and waste valves to divert said pressure to the control valve for operating the same on the closing of said exhaust port by the cleaver arm.

DOUGLAS H. ANNIN.